United States Patent [19]
Goreta et al.

[11] Patent Number: 5,859,913
[45] Date of Patent: Jan. 12, 1999

[54] METHOD AND SYSTEM FOR THE HIGH-SPEED GENERATION AND TRANSMISSION OF A SEQUENCE OF CHARACTERS BY MEANS OF VOICE FREQUENCIES

[75] Inventors: Lucas Goreta, Lyons; Christian DuRoux, Paris, both of France

[73] Assignee: Fintel S.A., Paris, France

[21] Appl. No.: 719,795

[22] Filed: Sep. 25, 1996

[30] Foreign Application Priority Data

Sep. 25, 1995 [FR] France .................................. 95 11414

[51] Int. Cl.$^6$ .............................. H04L 9/00; H04M 1/274
[52] U.S. Cl. .................................. 380/52; 380/9; 380/23; 380/28; 380/49; 380/59; 235/380; 379/355; 379/357; 379/360
[58] Field of Search ................................. 380/9, 28, 33, 380/34, 35, 36, 37, 38, 39, 40, 41, 42, 43, 44, 49, 50, 52, 59, 23, 24, 25; 379/355, 356, 357, 359, 360, 361; 235/379, 380

[56] References Cited

U.S. PATENT DOCUMENTS

| | | |
|---|---|---|
| 3,810,019 | 5/1974 | Miller . |
| 4,126,768 | 11/1978 | Grenzow .................................. 379/357 |
| 4,313,207 | 1/1982 | Nardozza et al. ..................... 360/49 X |
| 4,899,365 | 2/1990 | Hove . |
| 4,995,077 | 2/1991 | Malinowski ............................. 379/355 |

FOREIGN PATENT DOCUMENTS

| | | | |
|---|---|---|---|
| 318 454 | 5/1989 | European Pat. Off. . | |
| 2705853 | 12/1994 | France .......................... H04M 1/274 |
| 20 01 669 | 7/1970 | Germany . | |

OTHER PUBLICATIONS

J.L. Fike et al., "Understanding Telephone Electronics", (H.W. Sams & Co., Indianapolis; 1983; pp. 2–5 Through 2–10).

Patent Abstracts of Japan, vol. 9, No. 302 (E–362), Nov. 29, 1985 & JP A 60 141033 (Nippon Denki KK), Jul. 26, 1985.

Mar. 1989, Journal of the Audio Engineering Soc. (AES) vol. 37, No. 3, pp. 149–157, XP000098390 J.H. Hahn: "Analysis of Detection of Acoustically Coupled DTMF Signals".

Patent Abstracts of Japan, vol. 14, No. 362 (E–0960), Aug. 6, 1990 & JP A 02 1267756 (Sharp Corp.), May 15, 1990.

Apr. 28–30, 1986, Speech Tech '86, New York, NY, USA, pp. 131–134, XP000570881, Lee C.H. et al.: "An integrated voice–controlled voice messaging system".

Mar. 1969, Siemens Zeitscrift, vol. 43, No. 3, Munich (DE), pp. 121–135, XP002003686, Fischer et al.: "Modems für die parallelübertragung von daten über fernsprechwählnetze". listed on French Search Report for FR 520087.

*Primary Examiner*—Bernarr E. Gregory
*Attorney, Agent, or Firm*—Merchant, Gould, Smith, Edell, Welter & Schmidt

[57] ABSTRACT

Disclosed is a method enabling the generation, by means of voice frequencies, of a sequence of several characters and the high-speed transmission of these characters. This method comprises the step of the elimination, during transmission, of the blanks between two successive characters when these characters are distinct or are encoded distinctly.

9 Claims, 2 Drawing Sheets

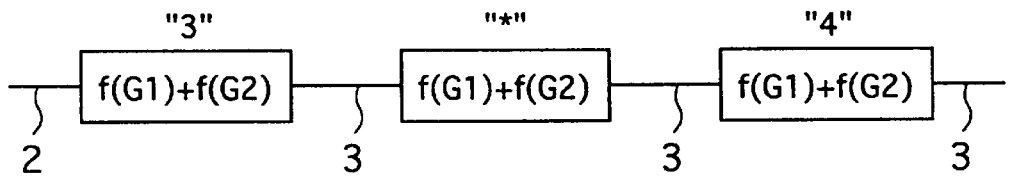
Fig. 1
Fig. 2
Fig. 3
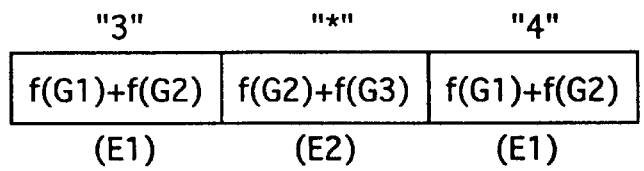
Fig. 4
Fig. 5
Fig. 6
Fig. 7

METHOD AND SYSTEM FOR THE HIGH-SPEED GENERATION AND TRANSMISSION OF A SEQUENCE OF CHARACTERS BY MEANS OF VOICE FREQUENCIES

BACKGROUND OF THE INVENTION

1. Field of the Invention

The field of the invention is that of the transmission of data on a telephone network.

More specifically, the invention relates to a method and a system enabling the generation, by means of voice frequencies, of a sequence of characters and the high-speed transmission of these characters.

In the present description, the term "sequence of characters" is understood to mean a sequence of at least two characters, especially but not exclusively a telephone number, an identification code or enciphering data elements.

The invention has many applications. Thus, the method and system according to the invention may be used to secure long-distance electronic transactions, especially those pertaining to telephone services for which it is essential to be able to speedily identify the provider of the telephone service, It can be applied more particularly when the long-distance electronic transactions are secured by means of portable objects having a credit card format, sending out voice signals and designed to be used in combination with telephone receivers.

2. Description of the Prior Art

Conventionally, the multi-frequency encoding used to transmit dialling, identification and enciphering information on a telephone network is a dual tone multi-frequency or DTMF encoding.

With this DTMF encoding, each character is encoded in the form of a combination of two frequencies (a high frequency and a low frequency) that are transmitted simultaneously, Each of the two frequencies transmitted is chosen from amongst two groups of four frequencies (namely a group of four low frequencies and a group of four high frequencies). One of the frequencies is chosen from one of the groups and the other frequency is chosen from the other group. It is thus possible to encode 4×4=16 different characters, i.e. generally the ten digits from 0 to 9 and six additional characters. Owing to the fact that they are located in the telephone passband (from 100 to 3300 Hz), these frequencies are generally called voice or acoustic frequencies. They enable the transmission of the telephone number of the called party and generally, in a conversation stage, of various other data elements (especially identification information). In general, DTMF encoding is implemented by means of a multi-frequency keyboard of a telephone set. The user enters the sequence of characters (for example the digits of a telephone number) by means of his keyboard. Each stroke on this keyboard enables the encoding and dispatch of one character.

There is also a known way of using DTMF encoding in a portable object (for example with a credit card format or in the form of tokens or pocket calculators) of the type designed to be used in combination with a telephone set. In this case, the user applies his portable object against the telephone set, and then activates it (for example by pressing a button designed for this purpose). The portable object then automatically enters a sequence of characters such as for example an identification key designed to be verified by a vocal server which is at the called number.

In general, DTMF encoding enables the transmission of data elements at a speed of 4 to 8 characters per second. While this speed is generally enough for the transmission of dialling information, it is not so for all information elements and especially for the identification codes. Indeed, the number of characters that may be contained in an identification code is sometimes fairly great, Owing to the low speed of transmission, the transmission time is then extremely (and excessively) long for normal use by a private party.

As can be seen with reference to FIGS. 1 to 4 which describe the essential characteristics of DTMF transmission, it is necessary to set up a blank between the transmission of two successive characters. Indeed, when two successive characters are identical, the two DTMF frequencies used to encode this character are the same. Consequently, if a blank is not inserted between two identical successive characters, one of them may be lost at the time of the decoding. The existence of this blank, whose duration is comparable to the period of transmission of a character, reduces the theoretical speed of transmission of the characters by half.

The technical problem to which the present invention proposes to provide a solution is that of the at least partial elimination of the blanks, the goal being to increase the speed of transmission of the characters.

SUMMARY OF THE INVENTION

This goal is achieved and this problem is resolved according to the invention by means of a method enabling the elimination, during transmission, of the blanks between two successive characters when these characters are distinct or are encoded distinctly.

In one variant to enable the elimination of the greatest number of blanks possible, the sequence of characters to be transmitted is processed beforehand so that two successive characters are not identical, the reverse operation is performed, after transmission, in order to obtain the original sequence, In another variant, to enable the elimination of all the blanks, the characters are encoded by the simultaneous transmission of N voice frequencies N being greater than or equal to 2), each chosen from among N+1 groups of voice frequencies at a rate of, at the most, one per group, the N groups selected are alternated regularly among the N+1 groups.

More particularly, when the matrix of the characters to be transmitted is the matrix of the sixteen DTMF characters:

the characters are encoded by the simultaneous transmission of two voice frequencies, each chosen from among two of the three groups (G1, G2, G3) of four voice frequencies at a rate of, at the most, one voice frequency chosen per group, the two groups (G1, G2) of the DTMF voice frequencies and the two groups (G2, G3) are selected alternately.

Thus, a case where two successive characters are generated with the same voice frequencies is avoided. It is thus possible to transmit the characters one after the other without any interruption time. The speed of transmission is therefore increased and in practice doubled.

Preferably, said sequence of characters belongs to the group comprising: telephone numbers, identification codes and enciphering data.

The invention also relates to a system enabling the generation, by means of voice frequencies, of a sequence comprising several characters representing data elements and the rapid transmission of these data elements from one place to another. This system has the characteristic of including the means for the implementation of the above-defined method.

More particularly, the system according to the invention consists of:

a portable object transmitting voice frequencies, designed to be used in combination with the microphone of a terminal, said portable object comprising:

means for the generation of N+1 groups of voice frequencies, with N greater than or equal to 2, means for the selection of N voice frequencies each chosen from among the N+1 groups of voice frequencies at a rate of, at the most, one voice frequency per group, means enabling the alternation of the combinations of N groups, means for the simultaneous transmission of the N voice frequencies selected, a communications network enabling the transmission of the characters representing the data elements from the microphone of the terminal to a distant computer, a computer comprising means enabling the reconstitution of the original sequence of characters and the processing of said sequence.

The invention also relates to a portable object transmitting voice frequencies, designed to be used in combination with the microphone of a terminal, said portable object comprising:

means for the generation of N+1 groups of voice frequencies, with N greater than or equal to 2, means for the selection of N voice frequencies, each chosen from among the N+1 groups of voice frequencies at a rate of, at the most, one voice frequency per group, means enabling the alternation of the combinations of N groups, means for the simultaneous transmission of the N voice frequencies selected, The invention also relates to a terminal of the type enabling a user to enter a sequence of characters to be transmitted on a telephone network, said terminal comprising:

means for the generation of N+1 groups of voice frequencies, with N greater than or equal to 2, means for the selection of N voice frequencies each chosen from among the N+1 groups of voice frequencies at a rate of, at the most, one voice frequency per group, means enabling the alternation of the combinations of N groups, means for the simultaneous transmission of the N voice frequencies selected.

BRIEF DESCRIPTION OF THE DRAWINGS

Other features and advantages of the invention shall appear from the following description of two preferred embodiments of the invention given by way of indicatory and non-restrictive examples and from the appended drawings, of which:

FIG. 1 shows an exemplary sequence of characters generated by means of voice frequencies;

FIGS. 2 and 3 respectively show the two groups of voice frequencies used in the known DTMF encoding (FIG. 2) and the corresponding encoding table (FIG. 3);

FIG. 4 explains the generation of the sequence of FIG. 1 when the known DTMF encoding is implemented;

FIG. 5 shows the two sets of groups of voice frequencies used in a particular embodiment of the method of the invention;

FIG. 6 shows the encoding table corresponding to the second set of groups of voice frequencies appearing in FIG. 5;

FIG. 7 explains the generation of the sequence of FIG. 1 when the particular embodiment of the method of the invention is implemented;

MORE DETAILED DESCRIPTION

Figure 8:
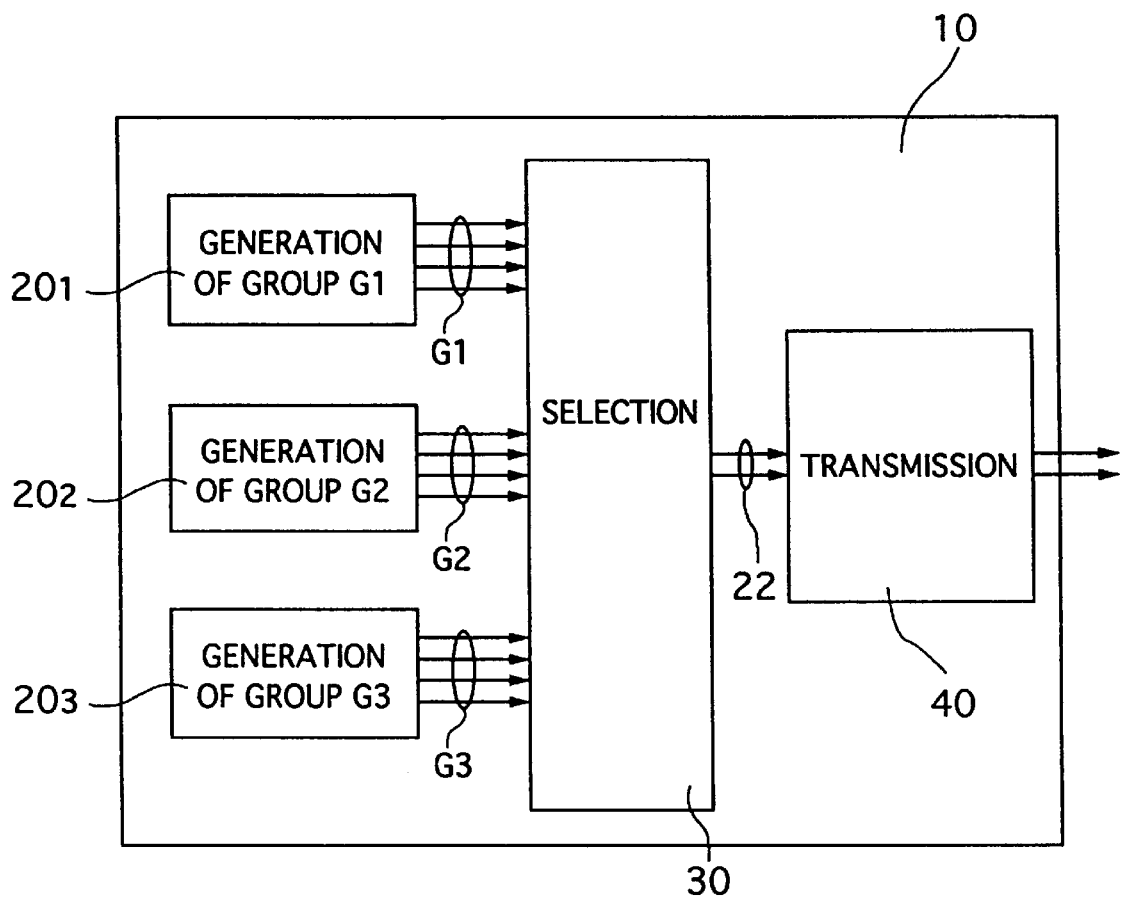
FIG. 8 shows a simplified drawing of a particular embodiment of the multi-frequency encoding device.

The invention therefore relates to a method and system enabling the generation and transmission, by means of voice frequencies, of a sequence of characters. A sequence of this kind is generally a telephone number, an identification code, or again an enciphering key, However, it is clear that the present invention can be applied to any type of sequence of characters.

FIG. 1 shows an exemplary sequence of characters 1 generated by means of voice frequencies, by a multi-frequency encoding device that is known or else the device of the invention. In this example, the first five characters of the sequence 1 are: "3", "*", "4", "#" and "1".

Referring to FIGS. 2, 3 and 4, we shall now briefly recall the essential characteristics of the known DTMF encoding. As is shown in FIG. 4, with the DTMF encoding, each character ("3", "*", "4", etc.) of the sequence 1 is encoded in the form of a combination of two frequencies {f(G1)+f(G2)}. In other words, a low frequency f(G1) and a high frequency f(G2) are transmitted simultaneously so as to generate a character. Each of the two frequencies f(G1), f(G2) transmitted simultaneously is chosen from among two groups of four frequencies at a rate of, at the most, one frequency per group. As shown in FIG. 2, these two groups are a group G1 of four low frequencies and a group of G2 of four high frequencies. It is thus possible to encode 4×4=16 different characters. The encoding table of these 16 characters is shown in FIG. 3. It comprises the ten digits (0 to 9) and six additional characters (letters A to F), two special characters "*" and "#" being encoded in the same way as the letters A and B respectively the first character ("3") of the sequence 1 is preceded by a starting silence 2, then two successive characters are always separated by a silence 3.

The main principle of the invention consists of the generation of each character by the simultaneous transmission of N voice frequencies (with N greater than or equal to 2), choosing these N voice frequencies from among N+1 groups of voice frequencies (while the DTMF encoding uses only two groups of voice frequencies), and then regularly alternating the N groups selected from among the N+1 groups.

If N is greater than 2, the number of different characters that can be encoded is increased with respect to DTMF.

Referring to FIGS. 5, 6 and 7, a description is now given of a particular mode of performing the method of the invention, in which N is equal to 2.

As shown in FIG. 7, with this mode of performing the method of the invention, each character ("3, "4", "4", etc.) of the sequence 1 is encoded in the form of a combination of two frequencies {f(G1)+f(G2)} or {(f(G2)+f(G3)}. The two voice frequencies f(G1) and f(G2) or f(G2) and f(G3) are chosen from among the first, second and third groups of voice frequencies G1, G2 and G3.

These groups of voice frequencies G1, G2 and G3 are divided into two sets (cf. table of FIG. 5), namely a first set E1 comprising the first and second groups G1, G2 and a second set E2 comprising the second and third groups G2, G3. The first and second groups G1, G2 are for example the two groups of frequencies conventionally used in DTMF (the latter have already been presented here above in the context of the reminder of the DTMF encoding method). In this case, the third group G3 also comprises four voice frequencies.

The encoding table associated with the second set E2 is shown in FIG. 6. This second set E2 associated with the first set E1 is shown in FIG. 2. It will be noted that these two tables of 16 characters are identical.

The two sets E1 and E2 are used alternately to generate two successive characters of the sequence 1. This enables the transmission of two successive characters, even if they are identical, without any intermediate silence. The standard transmission speed goes from 8 to 16 characters par second.

Referring to FIG. 8, a description shall now be given of a particular embodiment of the multi-frequency encoding device. This device comprises:

means $20_1$, $20_2$, $20_3$ for the generation of three groups G1, G2, G3 of voice frequencies, each group of voice frequencies comprising for example four voice frequencies;

means 30 for the selection of two voice frequencies 22 from among, alternately, the two groups of voice frequencies E1 (G1, G2) and E2 (G2, G3);

means 40 for the simultaneous transmission of the two selected voice frequencies 22.

Figure 9:
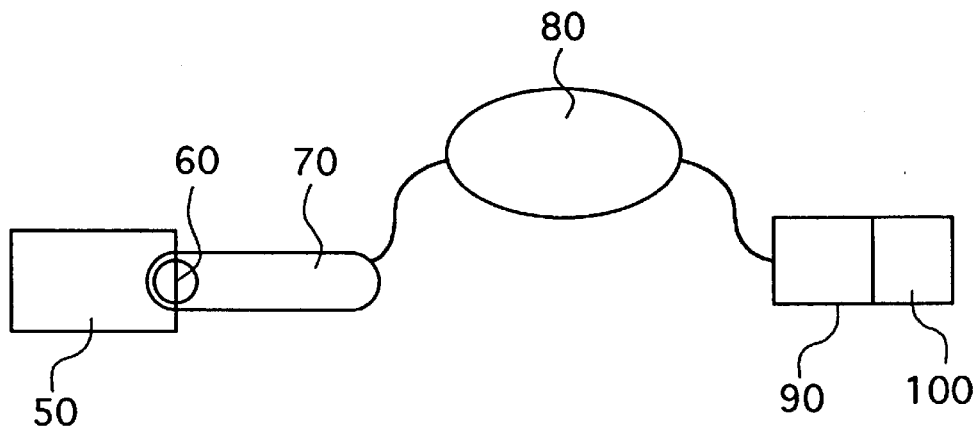
FIG. 9 shows a simplified drawing of a particular embodiment of the system according to the invention.

FIG. 9 shows a simplified diagram of a particular embodiment of the system according to the invention. The system according to the invention consists of:

a portable object 50 transmitting voice frequencies (as described with reference to FIG. 8) designed to be used in combination with the microphone 60 of a terminal 70 (telephone set, multimedia computer), said portable object comprising:

means 20 for the generation of N+1 groups of voice frequencies, with N greater than or equal to 2 (N=2 in the case of FIG. 8), means 30 for the selection of N voice frequencies, each chosen from among the N+1 groups of voice frequencies at a rate of, at the most, one voice frequency per group, means 30 enabling the alternation of the combinations of N groups, means 40 for the simultaneous transmission of N selected voice frequencies, a communications network 80 enabling the characters representing the data elements to be transmitted from the microphone of the telephone set to a distant computer, a computer 90 comprising means 100 enabling the reconstitution of the original sequence of characters and the processing of said sequence.

It is clear that the first set E1 may comprise the first and second group G1, G2 and that the second set E2 may comprise the groups G2 and G3 or G1 and G3.

It is also clear that those skilled in the art will easily be able to broaden the scope of this description to other cases and especially to the case where N=4 (with five groups in all and four frequencies transmitted simultaneously to encode a character). Consequently, the speed of transmission may be further increased if there are reception devices tuned both to these voice frequencies and to these transmission speeds.

The method and the system according to the invention can be implemented especially in a portable object as described here above. They may also be implemented in a multi-frequency terminal enabling a user to enter a sequence of characters (to be transmitted on the telephone network).

In order to eliminate the blanks (or intermediate silences) and in order to increase the speed of transmission of characters, two variants have also been envisaged, According to the first variant, two successive characters are transmitted with an intermediate silence only if they are identical; Whenever they are different, the two successive characters are transmitted without intermediate silence.

According to the second variant, the multi-frequency encoding proper is preceded by a processing step (function F) so as to prevent two successive characters of the frequency from being identical. At reception, the multi-frequency decoding is followed by a processing step in reverse to the previous one (function $F^{-1}$). It is within the range of those skilled in the art to choose and implement processing operators F and $F^{-1}$ such as these to obtain a result of this kind.

What is claimed is:

1. A method of generating a sequence of characters and transmitting said sequence of characters, said method comprising the step of encoding said sequence of characters, in using voice frequency within a range from 100 to 3300 Hz without providing any intermediate silence between two successive characters:

when these characters are not identical; or, when these characters are not encoded identically whereby a speed transmission of said sequence of characters is increased.

2. A method according to claim 1 wherein the step of encoding said sequence of characters, without providing any intermediate silence, comprises the steps of:

processing the sequence of characters to be transmitted beforehand, so that two successive characters are not identical; and performing a reverse operation, after transmission, in order to obtain an original sequence.

3. A method according to claim 1 wherein the step of encoding said sequence of characters, without providing any intermediate silence, comprising the steps of:

selecting N groups among N+1 groups of voice frequencies, N being greater than or equal to 2;

alternating regularly the N groups selected among the N+1 groups; and, encoding the characters by simultaneous transmission of N voice frequencies each chosen from said N groups at a rate of, at the most, one per group.

4. A method according to claim 1, a matrix of the characters to be transmitted being a matrix of sixteen DTMF characters, wherein said method comprises the steps:

selecting a first set of two groups of voice frequencies and a second set of two groups of voice frequencies from among three groups of four voice frequencies;

alternating said first set of two groups and said second set of two groups; and encoding the characters by simultaneous transmission of two voice frequencies, each two voice frequencies being chosen alternately from among said first and second set of two groups at a rate of one voice frequency chosen, at the most, per group.

5. A method according to claim 4, wherein the sequence of several characters belongs to the group comprising:

telephone numbers;

identification codes; and, encryption data.

6. A system for generating a sequence comprising several characters representing data elements and for transmitting the data elements over a distance, said system comprising:

a portable object transmitting voice frequencies within the range 100 to 3300 Hz to a microphone of a terminal, said portable object comprising an encoder for encoding said sequence of characters, in using voice frequency without providing any intermediate silence between two successive characters:

when these characters are not identical; or, when these characters are not encoded identically whereby a speed transmission of said sequence of characters is increased;

a communication network for transmission of the characters representing the data elements from the microphone of the terminal to a distant computer; and said computer comprising means for reconstituting an original sequence of characters and processing of said sequence.

7. A system for generating a sequence comprising several characters representing data elements and for transmitting the data elements over a distance, said system, comprising:

a portable object transmitting voice frequencies to a microphone of a terminal, said portable object comprising:

a generator for generating N+1 groups of voice frequencies, with N not less than 2;

means for selecting N groups of voice frequencies each chosen from among the N+1 groups of voice frequencies;

means for alternating combinations of N groups;

means for encoding the characters by simultaneous transmission of N voice frequencies, each chosen from said N groups at a rate of at the most, one per group;

a communications network for transmission of the characters representing the data elements from the microphone of the terminal to a distant computer; and, said computer comprising means for reconstituting an original sequence of characters and processing of said sequence.

8. A portable object transmitting voice frequencies to a microphone of a terminal, said portable object comprising:

means for generating N+1 groups of voice frequencies, with N not less than 2;

means for selecting N groups of voice frequencies, each chosen from among the N+1 groups of voice frequencies;

means for alternating combinations of N groups; and, means for encoding a sequence comprising several characters by simultaneous transmission of N voice frequencies, each chosen from said N groups at a rate of at the most, one voice frequency per group.

9. A multi-frequency terminal to enter a sequence of characters to be transmitted on a telephone network, said terminal comprising;

means for generating N+1 of voice frequencies, with N not less than 2;

means for selecting N groups of voice frequencies each chosen from among the N+1 groups of voice frequencies;

means for alternating combinations of N groups; and, means for encoding the characters by simultaneous transmission of N voice frequencies, each chosen from said N groups at a rate of, at the most, one voice frequency per group.

* * * * *